(12) United States Patent
Ishida

(10) Patent No.: US 12,175,388 B2
(45) Date of Patent: Dec. 24, 2024

(54) STORAGE MEDIUM, INFORMATION PROCESSING DEVICE, AND CONTROL METHOD

(71) Applicant: FUJITSU GENERAL LIMITED, Kanagawa (JP)

(72) Inventor: Tsutomu Ishida, Kawasaki (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 52 days.

(21) Appl. No.: 17/359,837

(22) Filed: Jun. 28, 2021

(65) Prior Publication Data

US 2022/0067561 A1    Mar. 3, 2022

(30) Foreign Application Priority Data

Sep. 1, 2020    (JP) ................................. 2020-146476

(51) Int. Cl.
| | | |
|---|---|---|
| *G06N 7/01* | (2023.01) | |
| *G16Y 10/80* | (2020.01) | |
| *H04L 67/50* | (2022.01) | |

(52) U.S. Cl.
CPC ............ *G06N 7/01* (2023.01); *H04L 67/535* (2022.05); *G16Y 10/80* (2020.01)

(58) Field of Classification Search
None
See application file for complete search history.

(56) References Cited

U.S. PATENT DOCUMENTS

2005/0120095 A1*  6/2005  Aman ................. H04L 67/1008
                                                   709/219
2007/0149216 A1*  6/2007  Misikangas ......... G01S 5/02524
                                                   455/456.1

(Continued)

FOREIGN PATENT DOCUMENTS

| JP | H08-061741 A | 3/1996 |
|---|---|---|
| JP | 2015-122055 A | 7/2015 |

(Continued)

OTHER PUBLICATIONS

James Scott et al., "PreHeat: Controlling Home Heating Using Occupancy Prediction", UbiComp'11, Sep. 17-21, 2011, Beijing, China (Total 10 pages).

(Continued)

*Primary Examiner* — Thu V Nguyen
*Assistant Examiner* — Emad Siddiqi
(74) *Attorney, Agent, or Firm* — GREENBLUM & BERNSTEIN, P.L.C.

(57) ABSTRACT

A non-transitory computer-readable storage medium storing a selection program that causes at least one computer to execute a process, the process includes receiving identification information regarding a terminal from the terminal; selecting one or more user state transition patterns, a number of which is according to the identification information, from among a plurality of the user state transition patterns, which are a plurality of patterns of user state transition obtained by clustering information that indicates the user state transition, which is a time-series transition of a state of a user during a predetermined unit time; and transmitting the one or more user state transition patterns to the terminal.

6 Claims, 22 Drawing Sheets

(56) References Cited

U.S. PATENT DOCUMENTS

| | | | |
|---|---|---|---|
| 2011/0060709 A1* | 3/2011 | Ide | G01C 21/3484 706/12 |
| 2014/0359637 A1* | 12/2014 | Yan | G06F 9/4881 718/108 |
| 2015/0142140 A1 | 5/2015 | Yamaguchi et al. | |
| 2015/0309483 A1* | 10/2015 | Lyman | G05B 13/02 700/275 |
| 2017/0091669 A1 | 3/2017 | Kuromatsu et al. | |
| 2017/0191693 A1* | 7/2017 | Bruhn | F24F 11/58 |
| 2018/0089556 A1* | 3/2018 | Zeiler | G06N 3/08 |
| 2018/0129959 A1* | 5/2018 | Gustafson | G06N 20/00 |
| 2021/0073451 A1 | 3/2021 | Otani et al. | |
| 2021/0406417 A1* | 12/2021 | Hamada | G06F 30/15 |
| 2022/0269835 A1* | 8/2022 | Yang | G06N 7/01 |

FOREIGN PATENT DOCUMENTS

| | | |
|---|---|---|
| JP | 2016-163193 A | 9/2016 |
| JP | 2017-68710 | 4/2017 |
| JP | 2018-035957 A | 3/2018 |
| JP | 2018-091560 A | 6/2018 |
| JP | 2020-9290 | 1/2020 |

OTHER PUBLICATIONS

Official communication in corresponding JP App. No. 2020-146476 dated Apr. 23, 2024, along with English translation thereof.

* cited by examiner

FIG. 3

| DATE | FEATURE VECTOR | | | |
|---|---|---|---|---|
| | t1 | t2 | t3 | ... |
| 1/1/2020 | 1 | 0 | 1 | ... |
| 1/2/2020 | 1 | 1 | 1 | ... |
| ... | ... | ... | ... | ... |

FIG. 4A

| PROBABILISTIC MODEL ID | TIME POINT | IN-ROOM PRESENCE PROBABILITY |
|---|---|---|
| PROBABILISTIC MODEL 1 | t1 | 0.8 |
| | t2 | 0.5 |
| | ... | ... |
| PROBABILISTIC MODEL 2 | t1 | 0.5 |
| | t2 | 0.8 |
| | ... | ... |
| ... | ... | ... |

FIG. 4B

| PROBABILISTIC MODEL ID | TIME POINT | IN-ROOM PRESENCE PROBABILITY | DAY OF WEEK |
|---|---|---|---|
| PROBABILISTIC MODEL 1 | t1 | 0.8 | WEDNESDAY |
| | t2 | 0.5 | |
| | ... | ... | |
| PROBABILISTIC MODEL 2 | t1 | 0.5 | TUESDAY |
| | t2 | 0.8 | |
| | ... | ... | |
| ... | ... | ... | ... |

FIG. 5

| IDENTIFICATION INFORMATION | UPPER LIMIT NUMBER OF CLUSTERS |
|---|---|
| X001 | 10 |
| X002 | 3 |
| ... | ... |

FIG. 6

|  | TIME LENGTH | CONTROL CONTENTS |
|---|---|---|
| EXPECTED TO BE ABSENT | 30 MINUTES | POWER SAVING MODE |
|  | 60 MINUTES | STOP OF WORKING |
|  | 90 MINUTES | CLEANING MODE |
|  | ... | ... |
| EXPECTED TO STAY AT HOME | 60 MINUTES | START OF WORKING |
|  | ... | ... |

FIG. 7

| DATE AND TIME | PREDICTION RESULT | REGISTERED CONTENTS |
|---|---|---|
| ... | ... | ... |
| 1/1/2020 12:00-12:30 | ABSENT | |
| 1/1/2020 12:30-14:00 | ABSENT | LAUNCH OF CLEANING MODE |
| 1/1/2020 14:30-15:00 | ABSENT | |
| 1/1/2020 15:30-16:00 | AT HOME | START OF WORKING |
| 1/1/2020 16:00-16:30 | AT HOME | |

FIG. 9A

| DATE AND TIME | DAY OF WEEK | WHETHER OR NOT PRESENCE IN ROOM IS FOUND | ROOM TEMPERATURE | HUMIDITY | OUTSIDE AIR TEMPERATURE | ... |
|---|---|---|---|---|---|---|
| 1/1/2020 0:00 | WEDNESDAY | FOUND | 20 | 55 | 10 | ... |
| 1/1/2020 0:30 | WEDNESDAY | NOT FOUND | 19 | 55 | 10 | ... |
| ... | ... | ... | ... | ... | ... | ... |

FIG. 9B

| EDGE ID | IDENTIFICATION INFORMATION |
|---|---|
| 001 | X002 |

STORAGE MEDIUM, INFORMATION PROCESSING DEVICE, AND CONTROL METHOD

CROSS-REFERENCE TO RELATED APPLICATION

This application is based upon and claims the benefit of priority of the prior Japanese Patent Application No. 2020-146476, filed on Sep. 1, 2020, the entire contents of which are incorporated herein by reference.

FIELD

The embodiments discussed herein are related to a selection program, an information processing device, and a control method.

BACKGROUND

In recent years, with the progress of Internet of things (IoT), the amount of data produced by end devices is expanding. Along with this, it has been becoming difficult to process all data and control the end devices on an information processing device (for example, a cloud server) side. Thus, attention is focused on edge computing, in which not only the information processing device but also the end devices play a part in processing.

The edge computing is constituted by, for example, the information processing device and a plurality of edge terminals, which are the end devices. By performing distributed processing on both of the information processing device and the edge terminals, the reduction of the load on the information processing device may be achieved.

Japanese Laid-open Patent Publication No. 08-061741, Japanese Laid-open Patent Publication No. 2018-035957, and Japanese Laid-open Patent Publication No. 2015-122055 are disclosed as related art.

SUMMARY

According to an aspect of the embodiments, a non-transitory computer-readable storage medium storing a selection program that causes at least one computer to execute a process, the process includes receiving identification information regarding a terminal from the terminal; selecting one or more user state transition patterns, a number of which is according to the identification information, from among a plurality of the user state transition patterns, which are a plurality of patterns of user state transition obtained by clustering information that indicates the user state transition, which is a time-series transition of a state of a user during a predetermined unit time; and transmitting the one or more user state transition patterns to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a feature vector database (DB) 103;

FIG. 4A is an example of a probabilistic model stored in a clustering result DB 104; furthermore, FIG. 4B is an example of a probabilistic model stored in the clustering result DB 104 in which the days of the week are associated;

FIG. 5 is a diagram illustrating an example of information stored in a cluster number designation DB 105;

FIG. 6 is a diagram illustrating an example of information stored in a control reference DB 106;

FIG. 7 is a diagram illustrating an example of information stored in a schedule DB 107;

FIG. 9A is a diagram illustrating an example of information stored in a sensor value DB 203; furthermore, FIG. 9B is a diagram illustrating an example of information stored in an edge terminal log DB 204;

DESCRIPTION OF EMBODIMENTS

A plurality of edge terminals connected to an information processing device individually has different processing capacities that are equipped and different amounts of information (resources) that can be held. Therefore, when processes are performed by the edge computing, it is preferable to allow the information processing device to allocate the processing 1g load to each edge terminal according to the processing capacity and resources of each edge terminal.

One aspect of the present embodiment aims to provide a selection program, an information processing device, and a control method capable of allocating a processing load according to the processing capacity and resources of an edge terminal.

In edge computing, for example, in order to achieve the reduction of the load on an information processing device, distributed processing is carried out by both of the information processing device and a plurality of edge terminals. As such distributed processing, for example, a method in which each edge terminal executes a process in accordance with a rule delivered by the information processing device is conceivable. According to this method, since the information processing device only needs to deliver a rule (and to generate a rule as needed), the load on the information processing device may be reduced.

At this time, by increasing the number of rules, it may be enabled to instruct the edge terminal to perform a finely defined process, and the processing accuracy may be improved. However, it is sometimes not desirable to increase the number of rules uniformly for all edge terminals. For example, a case where the edge terminals are each different in the processing capacity and resources is conceivable. In such a case, there is a problem that, for example, many rules put a burden on an edge terminal having a relatively small processing capacity and resources, and a processing delay occurs.

In the embodiments disclosed below, a selection program, an information processing device, and a control method capable of allocating a processing load to each edge terminal according to the processing capacity and resources of each edge terminal will be described.

Note that the present embodiments are not limited to these embodiments. Furthermore, the embodiments may be appropriately combined with each other within a range without inconsistency.

First Embodiment

Figure 1:
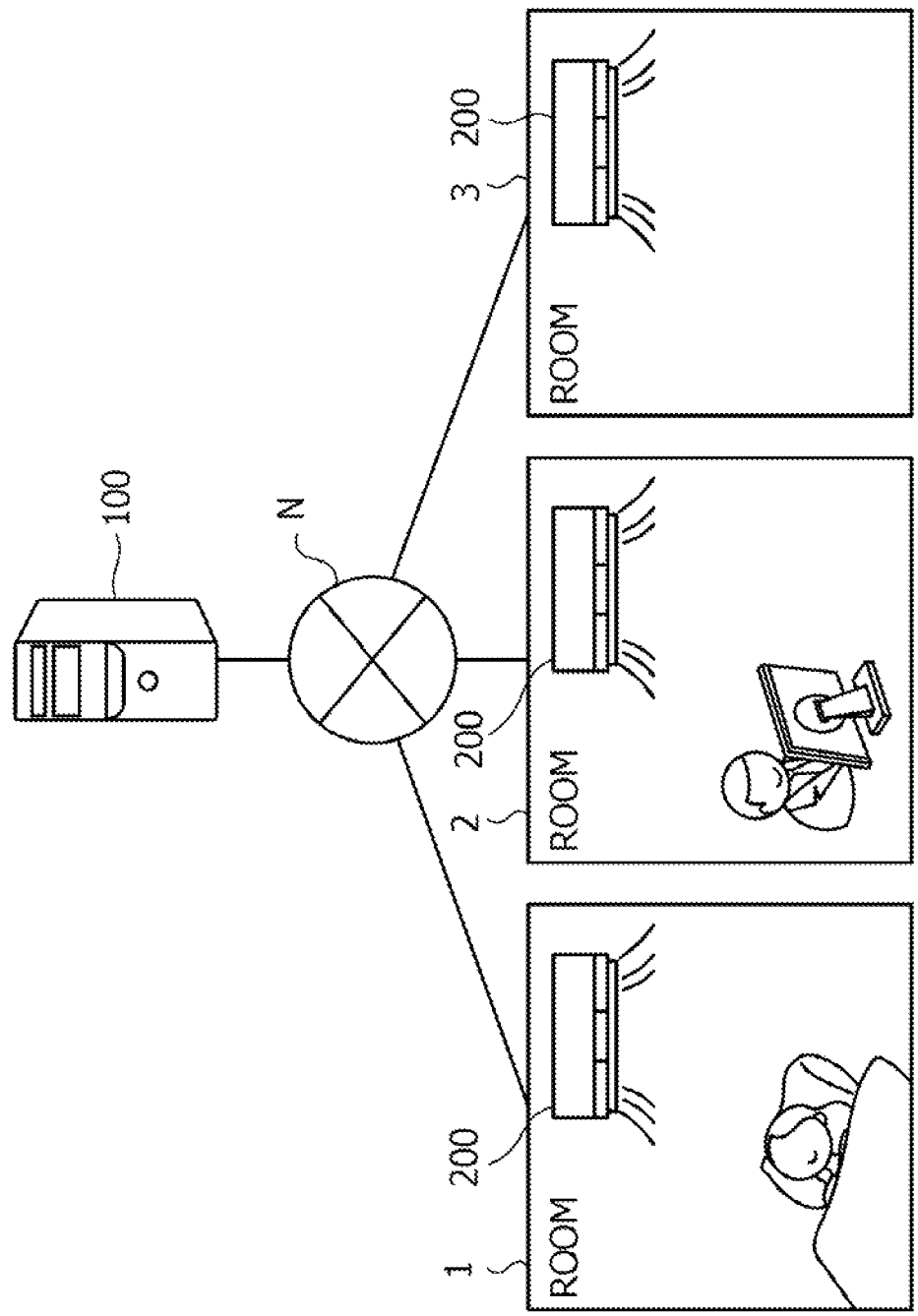
FIG. 1 is a diagram illustrating an example of the overall configuration of a system according to a first embodiment.

FIG. 1 is a diagram illustrating an example of an overall configuration of a system according to a first embodiment. As illustrated in FIG. 1, this system is a system in which a cloud server 100 and a plurality of edge terminals 200 are connected to each other via a network N so as to be able to communicate with each other. Note that, as the network N, various communication networks such as the Internet may be adopted regardless of wired or wireless communication. The cloud server 100 is an example of a computer and an information processing device. The edge terminal 200 provided in each of rooms 1 to 3 is an example of an air conditioning machine or an air conditioner that executes air conditioning control in the room.

[Functional Configuration of Cloud Server 100]

Figure 2:
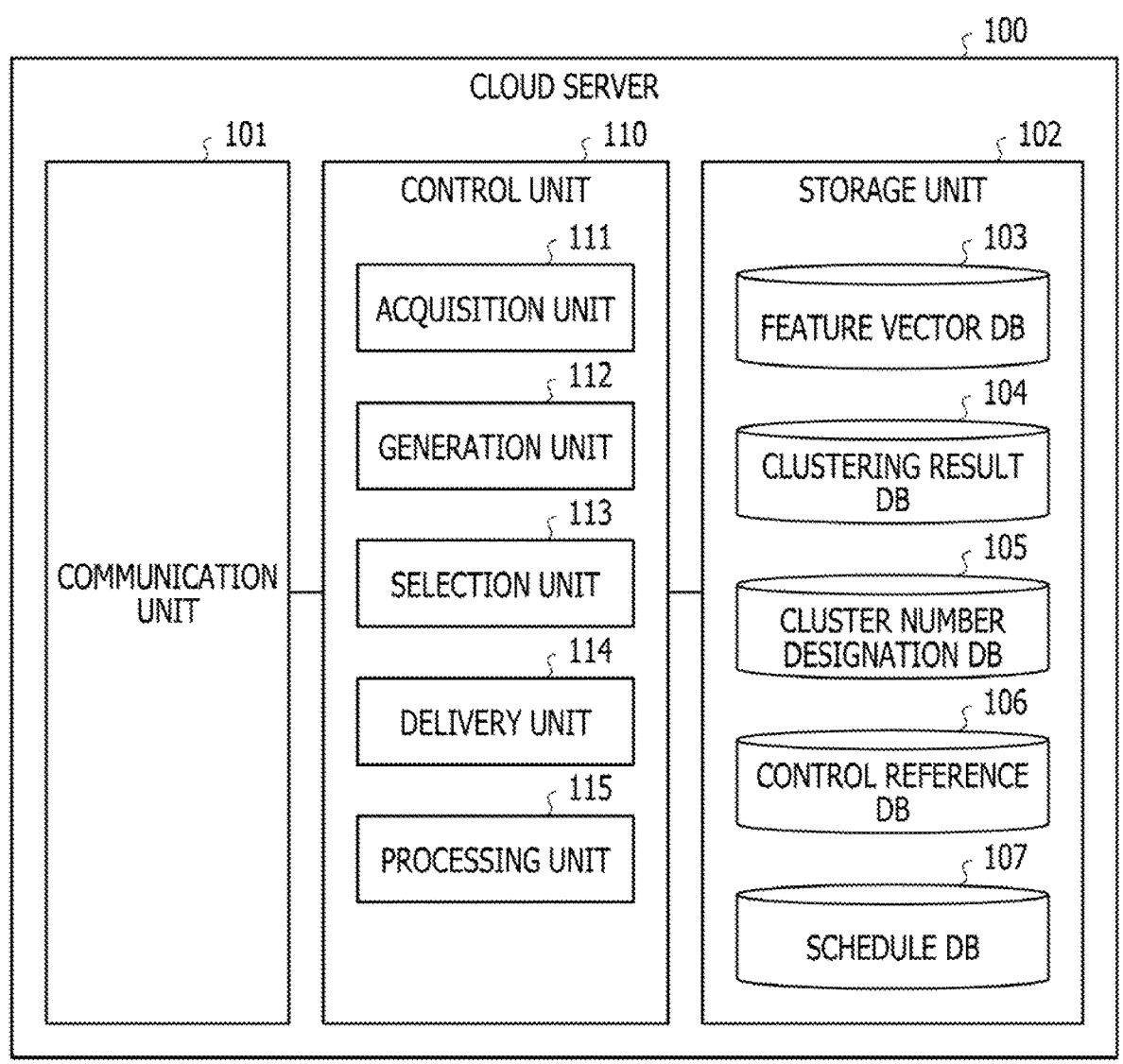
FIG. 2 is a functional block diagram illustrating a functional configuration of a cloud server 100 according to the first embodiment.

Next, a functional configuration of the cloud server 100 illustrated in FIG. 1 will be described. FIG. 2 is a functional block diagram illustrating a functional configuration of the cloud server 100 according to the first embodiment. As illustrated in FIG. 2, the cloud server 100 includes a communication unit 101, a storage unit 102, and a control unit 110.

The communication unit 101 is a processing unit that controls communication with another device, and is implemented by a communication interface, for example.

The storage unit 102 stores various sorts of data and a program executed by the control unit 110. For example, the storage unit 102 is implemented by a memory, a hard disk, or the like. The storage unit 102 stores a feature vector DB 103, a clustering result DB 104, a cluster number designation DB 105, a control reference DB 106, and a schedule DB 107.

The feature vector DB 103 is a database that stores learning data. The clustering result DB 104 is a database that stores a clustering result. The cluster number designation DB 105 is a database that stores the upper limit number of pieces of learning data to be delivered to the edge terminal 200. The control reference DB 106 is a database in which the control contents for the edge terminal 200 are stored. The schedule DB 107 is a database in which a schedule for controlling the edge terminal 200 is stored.

The control unit 110 is a processing unit that is in charge of the entire process of the cloud server 100 and, for example, is implemented by a processor or the like. The control unit 110 includes an acquisition unit 111, a generation unit 112, a selection unit 113, a delivery unit 114, and a processing unit 115.

The acquisition unit 111 acquires a feature indicating the state of a user and identification information of the edge terminal 200. The feature indicating the state of the user is, for example, information indicating whether or not the user stays at home during a certain unit time (for example, every hour) or information indicating whether or not the user is sleeping. Furthermore, the identification information of the edge terminal 200 is information linked with the processing capacity of the edge terminal 200.

The generation unit 112 generates a probabilistic model indicating the transition of the user state. This is performed as follows. The generation unit 112 generates user state transition information, which is information in which the features indicating the states of the user per unit time, which have been acquired by the acquisition unit 111, are merged in a time series for a predetermined period (for example, 24 features per hour indicating the states of the user are merged to generate user state transition information of a certain user for one day). Then, a plurality of clusters is generated by clustering the user state transition information generated here under predetermined conditions. Next, in each cluster, a user state transition pattern that represents the cluster or typically indicates the cluster is generated based on one or more pieces of user state transition information contained in the cluster. In the present embodiment, as an example, this user state transition pattern is constructed in each cluster as a probabilistic model as described later. Summarizing the above, the generation unit 112 generates a plurality of user state transition patterns, which are a plurality of patterns of user state transition obtained by clustering information that indicates the user state transition, which is a time-series transition of the state of a user during a predetermined unit time.

When the number of probabilistic models exceeds an upper limit number set based on the acquired identification information of the edge terminal 200, the selection unit 113 selects a probabilistic model to deliver to the edge terminal 200, based on the number of features used in the cluster for the probabilistic model. For example, the selection unit 113 selects the probabilistic model such that the higher the processing capacity of the edge terminal, the greater the number of probabilistic models to be delivered to the edge terminal 200. Furthermore, when the number of generated probabilistic models exceeds the upper limit number, the selection unit 113 calculates the number of features used in the cluster for the probabilistic model, per probabilistic model. Then, the selection unit 113 selects a number of probabilistic models equal to the upper limit number, in an order from the one with the greatest number of features from among the generated probabilistic models. For example, the selection unit 113 selects one or more user state transition patterns, a number of which is according to the identification information, from among the plurality of user state transition patterns described above.

The delivery unit 114 delivers the selected probabilistic model via the communication unit 101. For example, the delivery unit 114 transmits one or more user state transition patterns to the edge terminal 200.

The processing unit 115 specifies the control contents for the edge terminal 200 based on a prediction result by the edge terminal 200.

[Example of Information Stored in Feature Vector DB 103]

FIG. 3 is a diagram illustrating an example of information stored in the feature vector DB 103. As illustrated in FIG. 3, the feature vector DB 103 stores "date and feature vectors" in association with each other.

As illustrated in FIG. 3, the feature vector has information indicating whether the user stays at home or is absent at each time point during a period from the start to the end of the unit time. For example, one feature vector (log) has a plurality of labels at each time point. When the user stays at home, the label "1" is set. On the other hand, when the user is absent, the label "0" is set. It is indicated that "on Jan. 1, 2020, the user stays at home at a time point of t1, the user is absent at a time point of t2, and the user stays at home at a time point of t3".

[Example of Information Stored in Clustering Result DB 104]

FIGS. 4A and 4B are diagrams illustrating examples of information stored in the clustering result DB 104. FIG. 4A is an example of the probabilistic model stored in the clustering result DB 104. FIG. 4B is an example of the probabilistic model stored in the clustering result DB 104 in which the days of the week are associated.

As illustrated in FIG. 4A, the clustering result DB 104 stores "probabilistic model identifier (ID), time point, and in-room presence probability" in association with each other. "Probabilistic model ID" stored here denotes an identifier that identifies the probabilistic model, and "time point" denotes a reference time point. Furthermore, "in-room presence probability" denotes a probability that the user is present. For example, it is indicated that "in a probabilistic model 1, the user's in-room presence probability is 0.8 at the time point of t1 and the user's in-room presence probability is 0.5 at the time point of t2."

As illustrated in FIG. 4B, the clustering result DB 104 stores "probabilistic model ID, time point, in-room presence probability, and day of the week" in association with each other. "Probabilistic model ID" stored here denotes an identifier that identifies the probabilistic model, and "time point" denotes a reference time point. Furthermore, "in-room presence probability" denotes a probability that the user is present. "Day of the week" denotes a day of the week represented by the probabilistic model. "Day of the week" is an example of a label given to the probabilistic model, and may be environmental information such as a measurement location.

[Example of Information Stored in Cluster Number Designation DB 105]

FIG. 5 is a diagram illustrating an example of information stored in the cluster number designation DB 105. As illustrated in FIG. 5, the cluster number designation DB 105 stores "identification information and upper limit number of clusters" in association with each other. Here, "identification information" denotes an identifier that identifies the model number of the edge terminal 200. Furthermore, "identification information" may denote an identifier indicating the processing capacity of the edge terminal 200. "Upper limit number of clusters" denotes the upper limit number of the probabilistic models to be delivered to the edge terminal 200. For example, it is indicated that "the upper limit number of probabilistic models that can be delivered to an edge terminal 200 having the model number X001 is 10".

[Example of Information Stored in Control Reference DB 106]

FIG. 6 is a diagram illustrating an example of information stored in the control reference DB 106. As illustrated in FIG. 6, "time length and control contents" are stored in association with each other for each of an "expected to be absent" state and an "expected to stay at home" state. "Time length" denotes the time length of a time while the user is present in the room or the time length of a time while the user is not present in the room. "Control contents" denote the contents of a process executed by the edge terminal 200. In the example in FIG. 6, it is indicated that, when the time length in which the user is expected to be absent is "equal to or longer than 30 minutes", control is exercised to launch "power saving mode" of the edge terminal 200.

[Example of Information Stored in Schedule DB 107]

FIG. 7 is a diagram illustrating an example of information stored in the schedule DB 107. As illustrated in FIG. 7, the schedule DB 107 stores "date and time, prediction result, and registered contents" in association with each other. "Date and time" stored here denotes a reference date and time. "Prediction result" denotes a result of predicting whether or not the user is present by the edge terminal 200. "Registered contents" denote the control contents for the edge terminal 200 that has accepted the user's instruction. In the example in FIG. 7, it is indicated that "the user is expected to be absent and the launch of the cleaning mode of the air conditioner is registered from 12:00 to 15:00". Furthermore, it is indicated that "the user is expected to stay at home and the start of working of the air conditioner is registered from 15:30 to 16:30"

[Functional Configuration of Edge Terminal 200]

Figure 8:
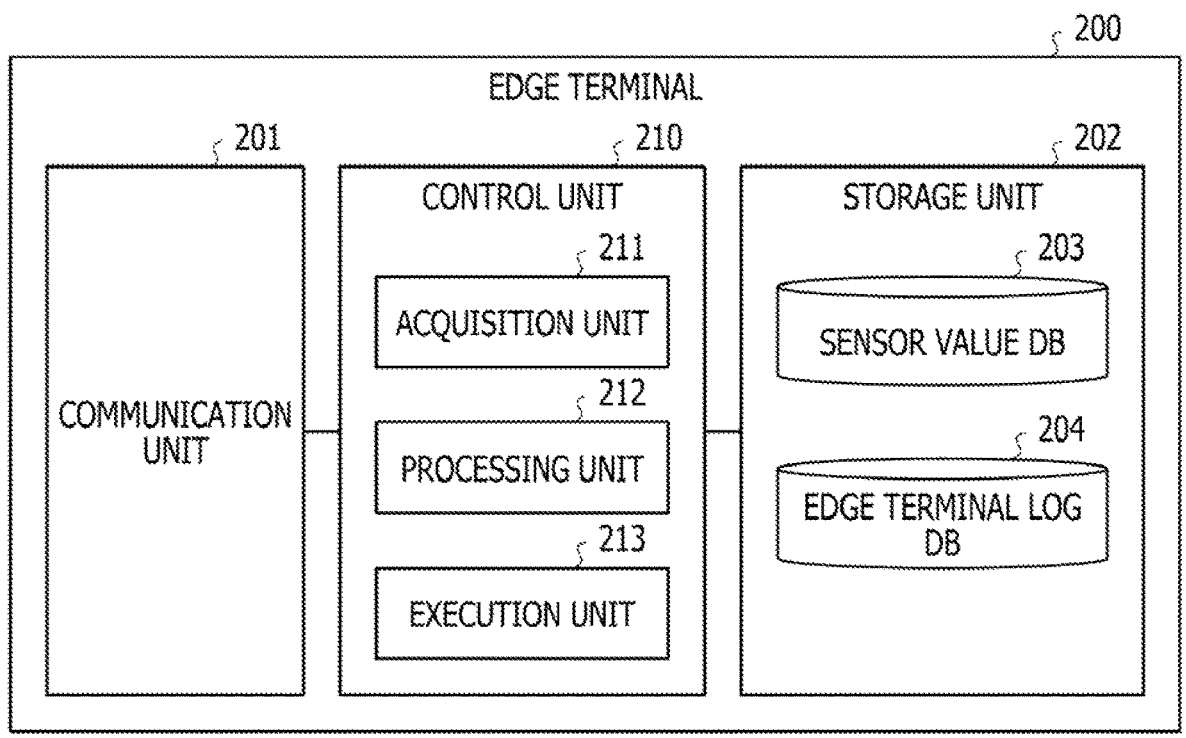
FIG. 8 is a functional block diagram illustrating a functional configuration of an edge terminal 200 according to the first embodiment.

FIG. 8 is a functional block diagram illustrating a functional configuration of the edge terminal 200 according to the first embodiment. The edge terminal 200 includes a communication unit 201, a storage unit 202, and a control unit 210.

The communication unit 201 is a processing unit that controls communication with another device, and is implemented by a communication interface, for example.

The storage unit 202 stores various sorts of data and a program executed by the control unit 210. For example, the storage unit 202 is implemented by a memory, a hard disk, or the like. The storage unit 202 stores a sensor value DB 203 and an edge terminal log DB 204.

The sensor value DB 203 is a database that stores a sensor value that identifies the state of the user, which has been acquired by sensors in each room. For example, the sensor value stored here may include another observed value that can be measured by the sensors, such as a temporal change in the temperature, in addition to the state of the user. The state of the user is, for example, information indicating whether or not the user is located in the room. The edge terminal log DB 204 is a database that stores the identification information of the edge terminal 200.

The communication unit 201 outputs sensor data and the like to the cloud server 100. Furthermore, the communication unit 201 receives the probabilistic model and the like delivered by the cloud server 100 from the cloud server 100. Moreover, the communication unit 201 transmits the prediction result by the probabilistic model to the cloud server 100.

The control unit 210 is in charge of the entire process of the edge terminal 200. The control unit 210 is implemented by, for example, a processor. The control unit 210 includes an acquisition unit 211, a processing unit 212, and an execution unit 213.

The acquisition unit 211 acquires a plurality of features indicating the state of the user from the start to the end of the unit time. For example, the acquisition unit 211 acquires a feature indicating whether or not the user is present in the room during a period from 0:00 to 24:00. At this time, the plurality of features indicating the state of the user from the start to the end of the unit time is transmitted to the cloud server 100.

Furthermore, the acquisition unit 211 acquires a plurality of features indicating the state of the user from the start of the unit time to the start time point of inference. For example, the acquisition unit 211 acquires a feature indicating whether or not the user was present in the room during a period from today's 0:00 to now.

The processing unit 212 predicts the state of the user during a period from the start time point of the inference to the end of the unit time, using the probabilistic model.

The execution unit 213 executes a process based on control information delivered from the cloud server 100.

[Example of Information Stored in Sensor Value DB 203]

FIG. 9A is a diagram illustrating an example of information stored in the sensor value DB 201 As illustrated in FIG. 9A, the sensor value DB 203 stores "date and time, day of the week, whether or not presence in room is found, room temperature, humidity, outside air temperature" and the like in association with each other. "Date and time" stored here denotes the date and time when the data was measured. "Day of the week" denotes the day of the week of a day on which the data was measured. "Whether or not presence in room is found" denotes a result of measuring the state of the user, and is a result of measuring whether or not the presence of the user is found. "Room temperature" and "humidity" are a temperature and humidity in the room measured by each sensor and the like in each room, respectively, and "outside air temperature" is a temperature outside the room measured by each sensor in each room. In the example in FIG. 9A, the sensor values are indicated every 30 minutes and, for example, it is indicated for a room 1 that "at 0:00 on Wednesday, Jan. 1, 2020, it was measured that the user was present, the room temperature was 20 degrees, the humidity in the room was 55%, and outside air temperature was 10 degrees".

[Example of Information Stored in Edge Terminal Log DB 204]

FIG. 9B is a diagram illustrating an example of information stored in the edge terminal log DB 204. As illustrated in FIG. 9B, the edge terminal log DB 204 stores "edge ID and identification information" in association with each other. "Edge ID" stored here denotes an ID that identifies the air conditioner, and "identification information" denotes an identifier that identifies the model number of the edge terminal 200. Furthermore, "identification information" may denote an identifier indicating the processing capacity of the edge terminal 200 mounted on the air conditioner.

[Functional Configuration of User Terminal 300]

Figure 10:
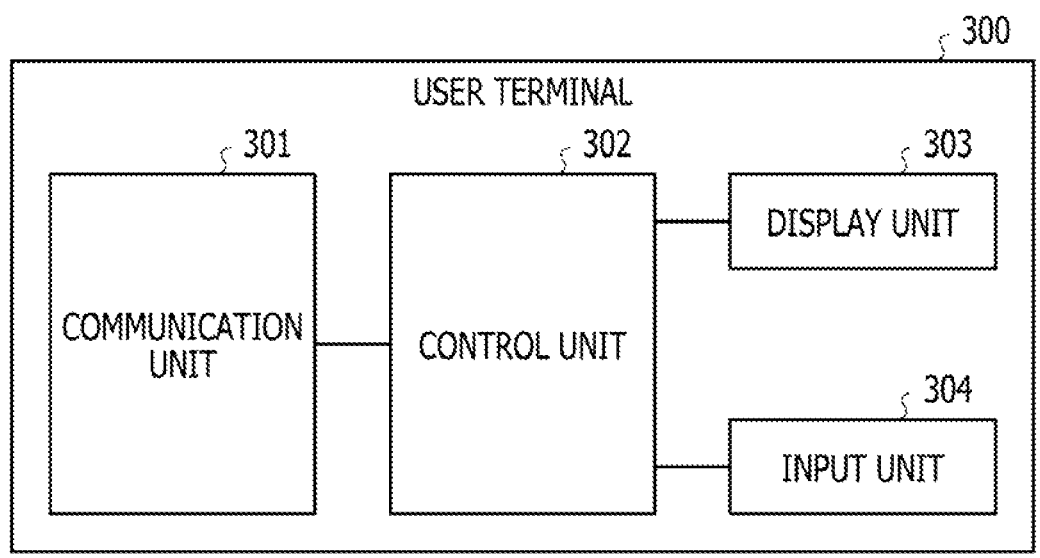
FIG. 10 is a functional block diagram illustrating a functional configuration of a user terminal 300 according to the first embodiment.

FIG. 10 is a functional block diagram illustrating a functional configuration of a user terminal 300 according to the first embodiment. As illustrated in FIG. 10, the user terminal 300 includes a communication unit 301, a control unit 302, a display unit 303, and an input unit 304.

The communication unit 301 outputs the operation contents accepted from the user to the cloud server 100. Furthermore, the communication unit 301 receives a control content candidate for the edge terminal 200 from the cloud server 100.

The control unit 302 is in charge of the entire process of the user terminal 300. The control unit 302 is implemented by, for example, a processor. The control unit 302 causes the display unit 303 to display a confirmation image as to whether or not to execute the control content candidate for the edge terminal 200.

The display unit 303 displays the confirmation image as to whether or not to execute the control content candidate for the edge terminal 200. The display unit 303 is implemented by, for example, a display device.

The input unit 304 inputs various sorts of information. The input unit 304 is implemented by, for example, a keyboard, a touch panel, or a mouse.

[Processing Flow of Control System]

Figure 11:
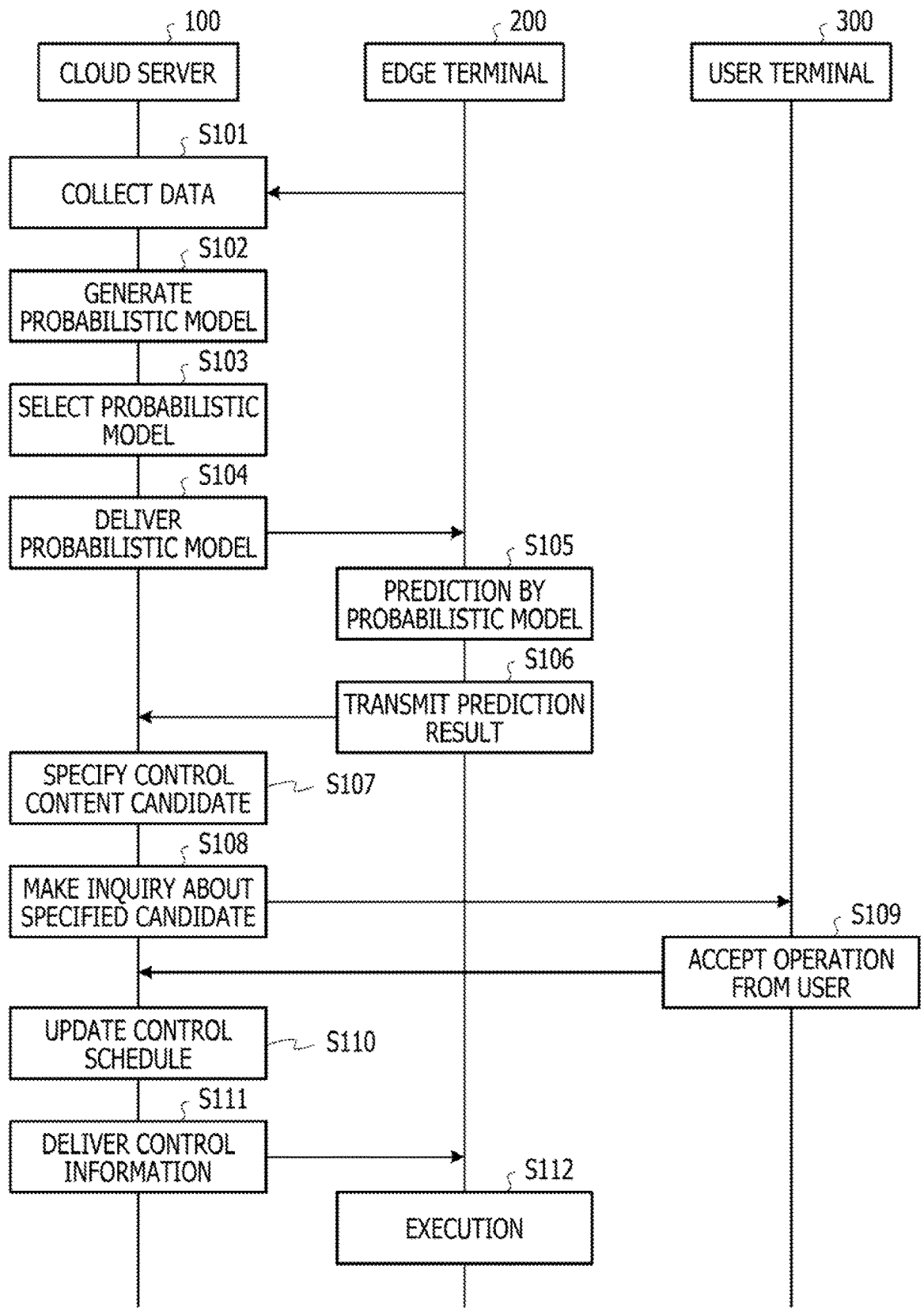
FIG. 11 is a sequence diagram illustrating a processing flow of a control system.

FIG. 11 is a sequence diagram illustrating a processing flow of a control system. A series of processes from the collection of learning data to the execution of control of the edge terminal 200 by the control system will be described with reference to FIG. 11.

As illustrated in FIG. 11, the acquisition unit 111 of the cloud server 100 acquires data including the identification information of the edge terminal 200 and the sensor value indicating the state of the user, from the edge terminal 200. For example, as illustrated in FIG. 9A, the acquisition unit 111 of the cloud server 100 acquires a sensor value including information indicating "whether the user is present in the room or absent" and information indicating "day of the week" at 30-minute intervals during a period from the start to the end of the day, from the edge terminal 200. Furthermore, as illustrated in FIG. 9B, the cloud server 100 acquires the identification information indicating that the model number of the terminal is "X002", from the edge terminal 200 (S101).

The generation unit 112 of the cloud server 100 generates learning data from the acquired data, and clusters the learning data to generate a probabilistic model. The generation unit 112 creates learning data having a feature vector indicating the state of the user per predetermined interval during a period corresponding to "date". Then, the generation unit 112 uses the learning data to generate a probabilistic model indicating the state of the user at each time point (S102).

The selection unit 113 selects a probabilistic model to be delivered to the edge terminal 200. For example, the selection unit 113 refers to the cluster number designation DB 105 on the basis of the identification information of the edge terminal 200, and specifies the upper limit number of the probabilistic models to be delivered to the edge terminal 200 associated with the identification information. Then, the selection unit 113 selects a probabilistic model to be delivered to the edge terminal 200 from among the generated probabilistic models when the number of generated probabilistic models exceeds the specified upper limit number The selection unit 113 selects the probabilistic model such that the higher the processing capacity of the edge terminal 200, the greater the number of probabilistic models to be delivered to the edge terminal 200 (S103).

The delivery unit 114 delivers the selected probabilistic model to the edge terminal 200 (S104).

The execution unit 213 of the edge terminal 200 executes predictive control using the delivered probabilistic model. For example, when a preset inference time point is reached, the execution unit 213 predicts the state of the user at each time point after the inference time point, based on the sensor value measured by the sensor and the probabilistic model (S105).

The processing unit 212 of the edge terminal 200 transmits the result of the prediction to the cloud server 100 (S106).

The processing unit 115 of the cloud server 100 specifies a control content candidate for the edge terminal 200. For example, as illustrated in FIG. 7, the processing unit 115 receives, from the edge terminal 200, a prediction result that "being absent is altered to staying at home at 15:30 and staying at home continues for a period of 60 minutes until 16:30". As illustrated in FIG. 6, the processing unit 115 refers to the information stored in the control reference DB 106, and specifies "start of working", which has a time length of 60 minutes, as a control content candidate (S107).

The processing unit 115 of the cloud server 100 inquires the user terminal 300 whether or not to execute the control content candidate (S108).

The input unit 304 of the user terminal 300 accepts an operation from the user. Then, the communication unit 301 transmits the accepted operation result to the cloud server 100 (S109).

The processing unit 115 of the cloud server 100 registers the operation result in the schedule DB 107. For example, as illustrated in FIG. 7, the processing unit 115 updates the control information of "start of working for a period from 15:30 to 16:30 during which staying at home is predicted" (S110).

The processing unit 115 of the cloud server 100 refers to the schedule DB 107, and delivers the registered control information to the edge terminal 200 (S111).

The execution unit 213 of the edge terminal 200 executes a process in accordance with the control information (S112).

[Process of Selecting Probabilistic Model]

Figure 12:
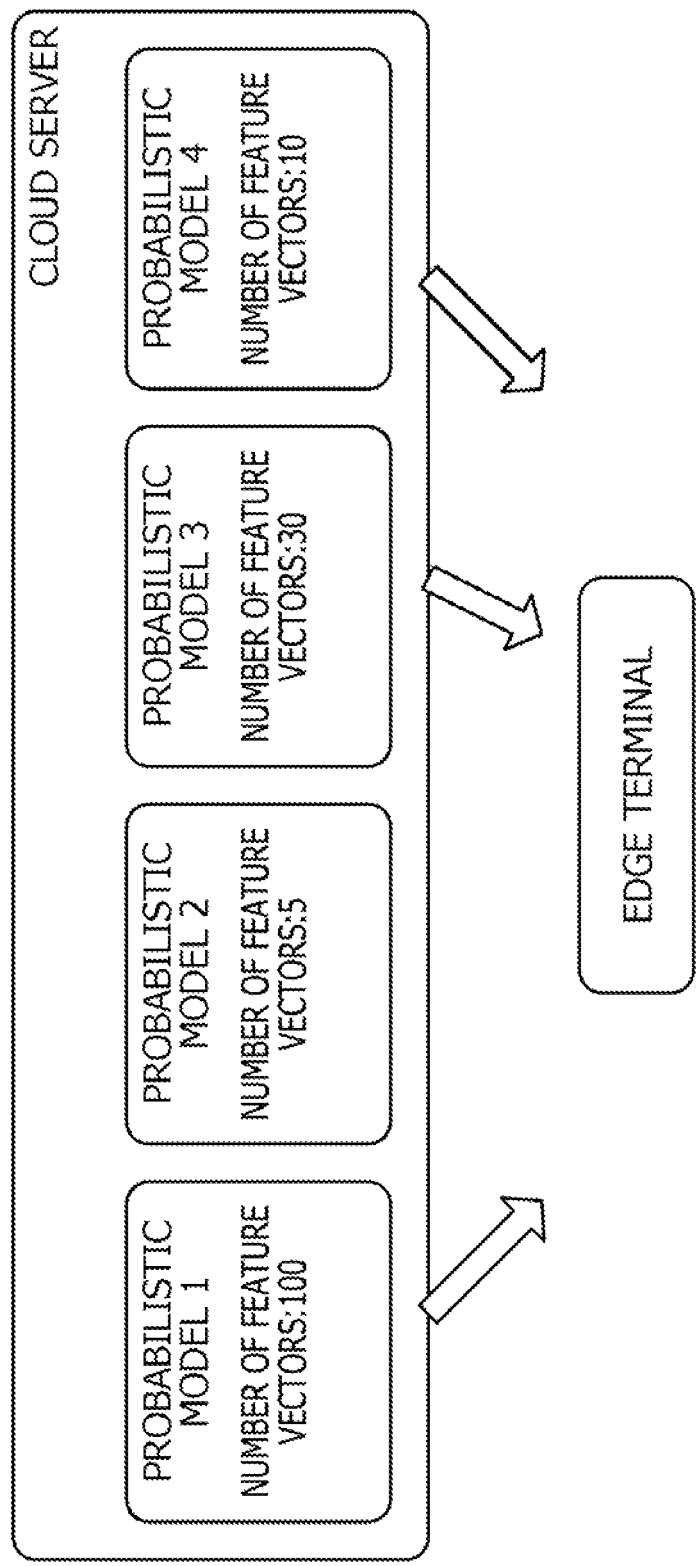
FIG. 12 is a diagram explaining a process of selecting a probabilistic model.

FIG. 12 is a diagram explaining a process of selecting a probabilistic model. Here, a process in which the selection unit 113 of the cloud server 100 selects a probabilistic model to be delivered to the edge terminal 200 from among the probabilistic models when the number of generated probabilistic models exceeds the upper limit number will be described with reference to FIG. 12.

As illustrated in FIG. 12, it is assumed that the generation unit 112 has generated four probabilistic models, namely, a probabilistic model 1, a probabilistic model 2, a probabilistic model 3, and a probabilistic model 4. Then, it is assumed that the selection unit 113 has specified that the upper limit number of probabilistic models to be delivered to the edge terminal 200 is three, on the basis of the identification information of the edge terminal 200. For example, the specification is made such that the higher the processing capacity of the edge terminal 200, the greater the upper limit number of probabilistic models. Furthermore, in another example, the specification is made such that the upper limit number of probabilistic models for a higher-end model edge terminal 200 is greater than the upper limit number of probabilistic models for a lower-end model edge terminal 200. In addition, the upper limit number of probabilistic models is specified according to the number of clocks of a central processing unit (CPU) mounted on the edge terminal 200.

Subsequently, the selection unit 113 selects a probabilistic model having a greater number of feature vectors used in the cluster for the probabilistic model. For example, the probabilistic model 1 is a model in which 100 feature vectors are clustered. Furthermore, the probabilistic model 2 is a model in which five feature vectors are clustered. The probabilistic model 3 is a model in which 30 feature vectors are clustered. Then, the probabilistic model 4 is a model in which 10 feature vectors are clustered. Thus, the selection unit 113 selects three probabilistic models, namely, the probabilistic model 1, the probabilistic model 3, and the probabilistic model 4, which have a greater number of feature vectors used in the cluster for the probabilistic model,

[Operation Screen on User Terminal]

Figure 13:
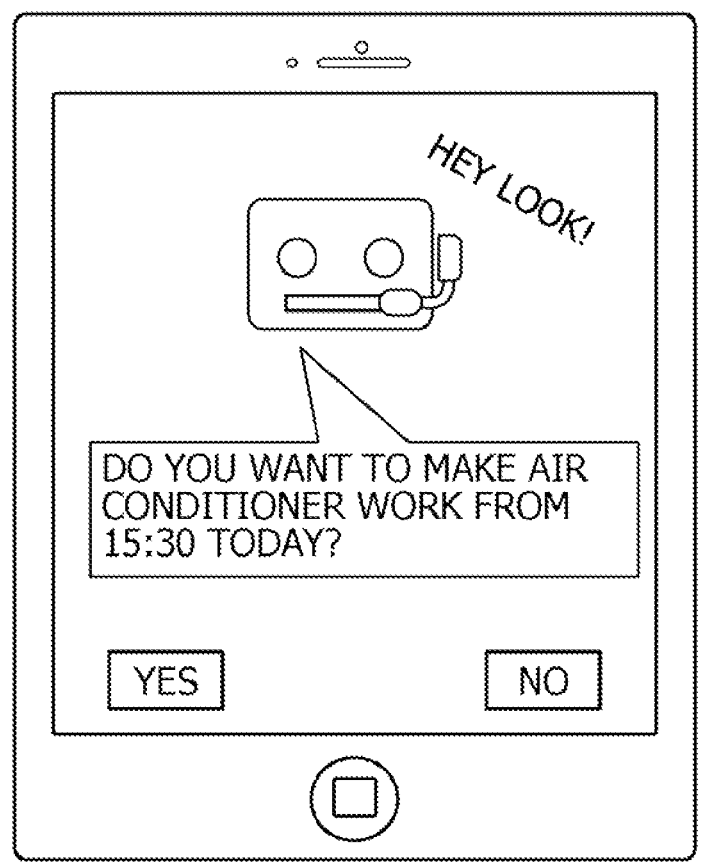
FIG. 13 is a diagram illustrating an example of an operation screen displayed on the user terminal 300.

FIG. 13 is a diagram illustrating an example of the operation screen displayed on the user terminal 300. As illustrated in FIG. 13, the display unit 303 of the user terminal 300 displays a screen that accepts whether or not to execute the control content candidate specified by the processing unit 115 of the cloud server 100. For example, the display unit 303 displays "whether or not to make the air conditioner work from 15:30 today" as a control content candidate. Then, the user terminal 300 displays a "YES" operation button that accepts to execute the control content candidate and a "NO" operation button that accepts not to execute the control content candidate.

[Learning Process in Cloud Server 100]

Figure 14:
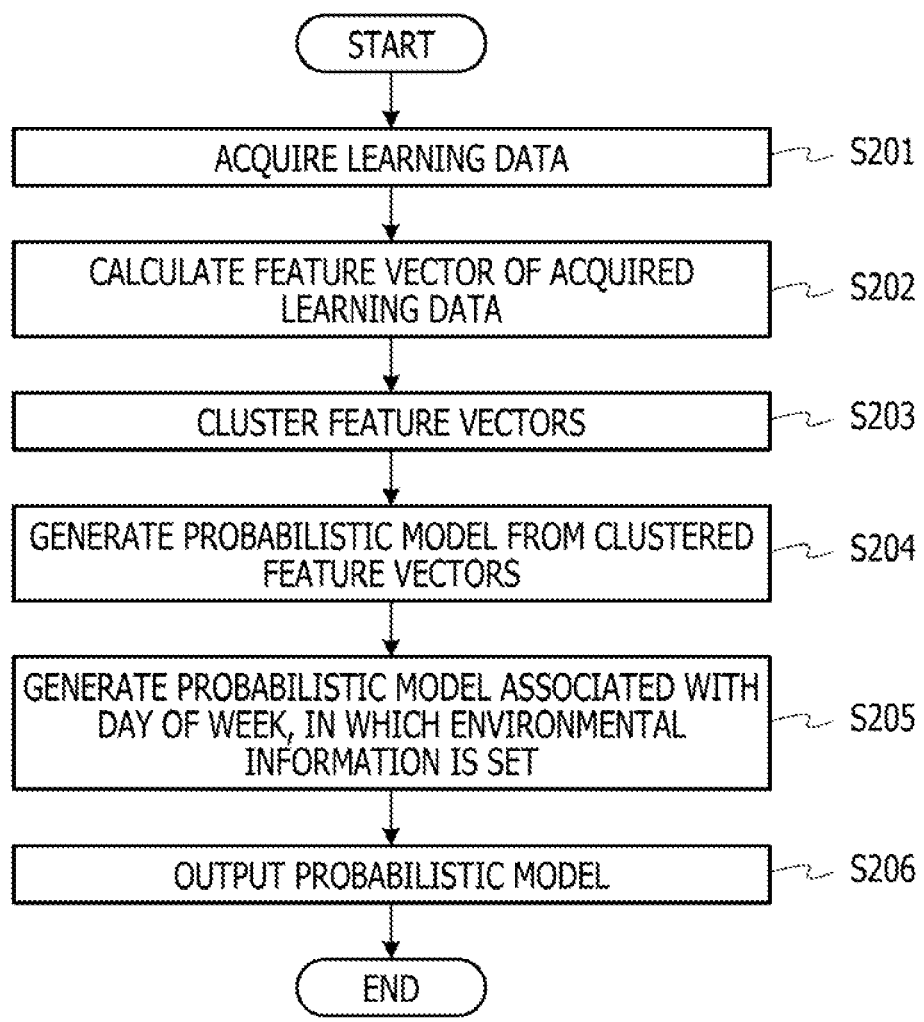
FIG. 14 is a diagram explaining a learning process in the cloud server 100.

Here, a learning process in the cloud server 100 will be described with reference to FIG. 14. FIG. 14 is a flowchart illustrating a detailed process in S102 in FIG. 11.

The generation unit 112 acquires the learning data (S201).

The generation unit 112 calculates a feature vector of the learning data (S202).

The generation unit 112 clusters the feature vectors. For example, the generation unit 112 computes the distance between feature vectors. Then, the generation unit 112 performs clustering such that feature vectors having a distance between the feature vectors equal to or shorter than a preset threshold value is contained in the same cluster. As the distance, for example, any distance such as the Euclidean distance or a distance based on a cosine can be used (S203).

The generation unit 112 generates a probabilistic model from the clustered feature vectors. For example, the generation unit 112 calculates the feature vector of the cluster from each of a plurality of feature vectors contained in the same cluster. Then, the generation unit 112 generates a probabilistic model using the calculated feature vector (S204).

The generation unit 112 generates a probabilistic model associated with a representative day of the week. The generation unit 112 specifies the day of the week on which the feature vector was measured, for each of the plurality of feature vectors contained in the cluster for the probabilistic model. Then, the generation unit 112 sets a day of the week having the greatest number of instances among the specified days of the week, as a representative day of the week of the probabilistic model. For example, as illustrated in FIG. 4B, the probabilistic model 1 is set to have Wednesday as the representative day of the week. As illustrated in FIG. 9A, this uses information on the day of the week contained in the sensor data to specify the day of the week on which the feature vector was measured, for each of the plurality of feature vectors contained in the cluster for the probabilistic model. The generation unit 112 generates at least one or more clusters by clustering a plurality of feature vectors based on each similarity between the plurality of feature vectors. Then, the generation unit 112 specifies a day of the week of the same type having the greatest number of instances among the days of the week associated individually with at least one or more feature vectors contained in the cluster, and generates a probabilistic model associated with the specified day of the week. This means that the generation unit 112 generates a probabilistic model associated with the day of the week, in which the environmental information is set (S205).

The generation unit 112 outputs the probabilistic model. Furthermore, the generation unit 112 outputs the probabilistic model associated with the day of the week (S206).

[Feature Vector of Learning Data]

Figure 15:
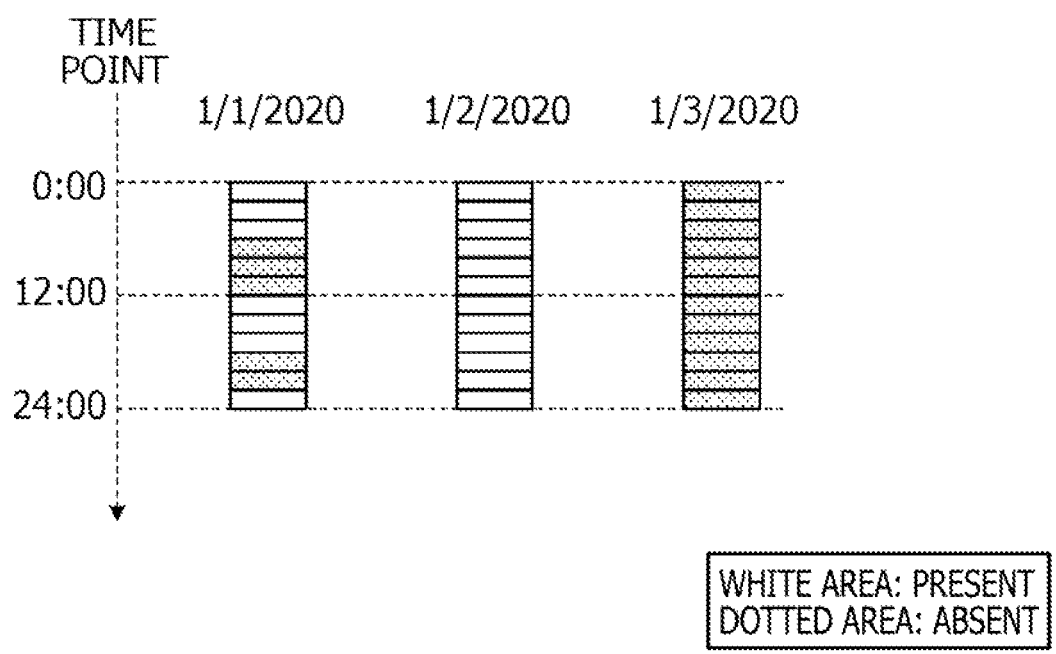
FIG. 15 is a diagram explaining a feature vector of learning data.

Here, the feature vector of the learning data will be described with reference to FIG. 15. The feature vector is information indicating the state of the user at each time point during a period from the start to the end of the unit time. For example, as illustrated in FIG. 15, the feature vector on Jan. 1, 2020 indicates that the user is absent in the latter half of the morning, but the user stays at home in the former half of the afternoon. Furthermore, the feature vector on Jan. 2, 2020 indicates that the user stays at home all day. On the other hand, the feature vector on Jan. 3, 2020 indicates that the user is absent all day.

[Probabilistic Model]

Figure 16:
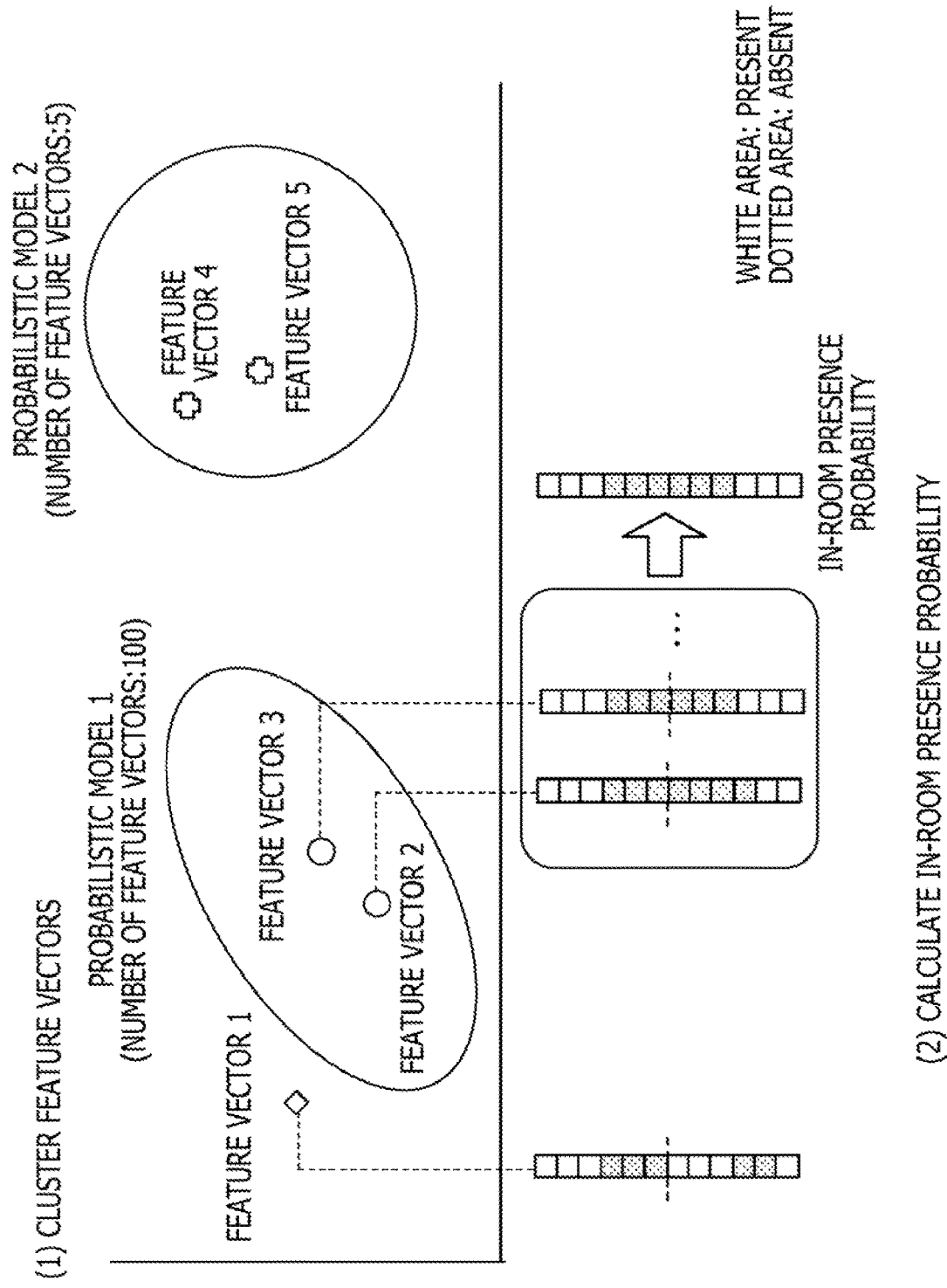
FIG. 16 is a diagram explaining a process of creating a cluster for a probabilistic model.
Figure 17:
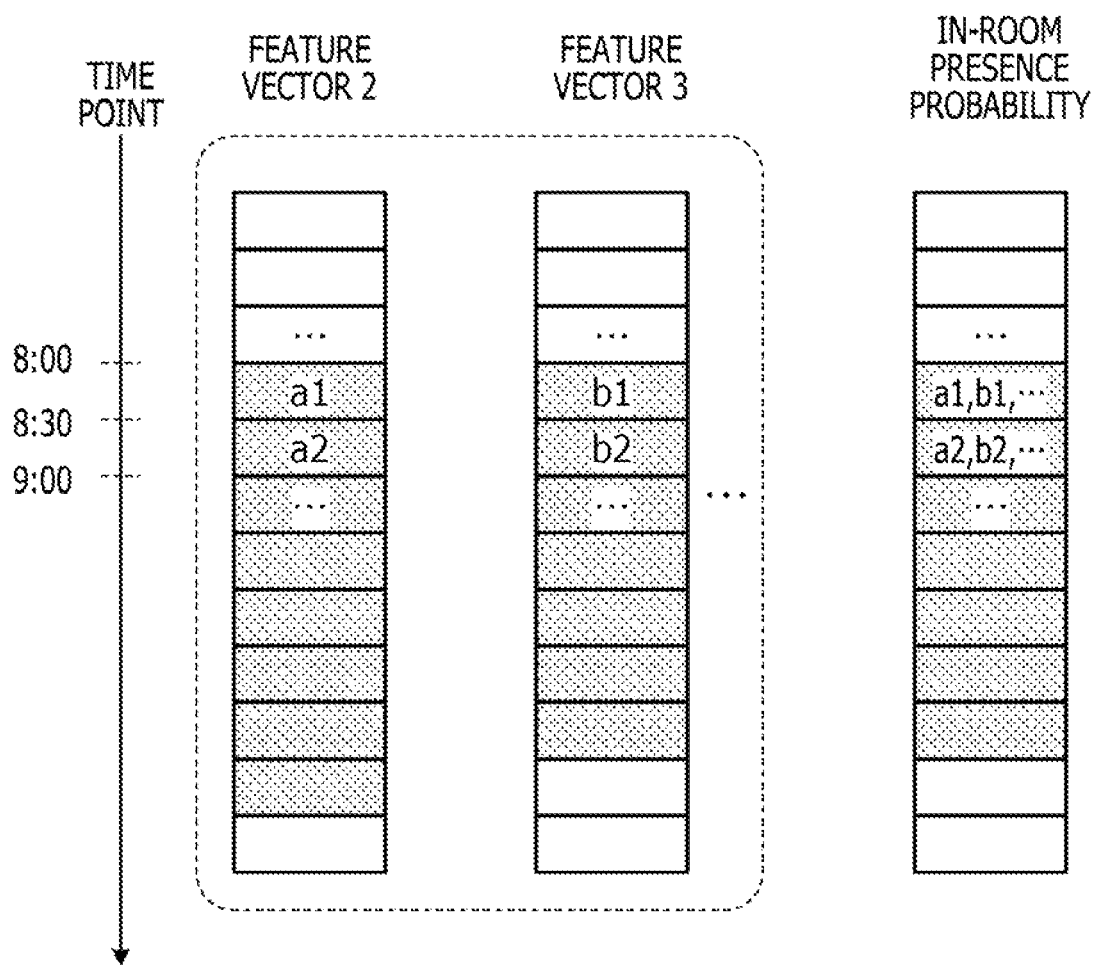
FIG. 17 is a diagram explaining a process of specifying an in-room presence probability from a cluster for a probabilistic model.

Here, the probabilistic model will be described with reference to FIGS. 16 and 17. FIG. 16 is a diagram explaining a process of creating a cluster for a probabilistic model. FIG. 17 is a diagram explaining a process of specifying an in-room presence probability from a cluster for a probabilistic model.

As illustrated in FIG. 16, the generation unit 112 clusters feature vectors having a short distance from each other from a plurality of feature vectors of the learning data. Then, the generation unit 112 generates a probabilistic model from the cluster obtained by clustering.

At this time, in the example in FIG. 15, the cluster for the probabilistic model 1 contains a feature vector 2, a feature vector 3, and the like. Then, the probabilistic model 1 has 100 feature vectors. Furthermore, the cluster for the probabilistic model 2 contains a feature vector 4, a feature vector 5, and the like. Then, the probabilistic model 2 has five feature vectors. Meanwhile, a feature vector 1 is a feature vector that does not belong to any probabilistic model. This is because the feature vector 1 was not clustered because the feature vector 1 has long distance from another feature vectors.

Subsequently, the generation unit 112 calculates the feature vector of the probabilistic model 1 using each of the 100 feature vectors belonging to the cluster for the probabilistic model 1. The calculated feature vector indicates the in-room presence probability. For example, as illustrated in FIG. 17, the generation unit 112 calculates the in-room presence probability of the probabilistic model from the average of the respective feature vectors. For example, the average value of a plurality of labels of the feature vectors from 8:00 to 8:30 is assumed as the in-room presence probability of the probabilistic model from 8:00 to 8:30. Furthermore, the average value of respective labels of a plurality of labels of the feature vectors from 8:30 to 9:00 is assumed as the in-room presence probability from 8:30 to 9:00. As a result, this allows the generation unit 112 to calculate a pattern indicating the user's in-room presence probability of the probabilistic model 1 at each time point.

[Prediction Process in Edge Terminal 200]

Figure 18:
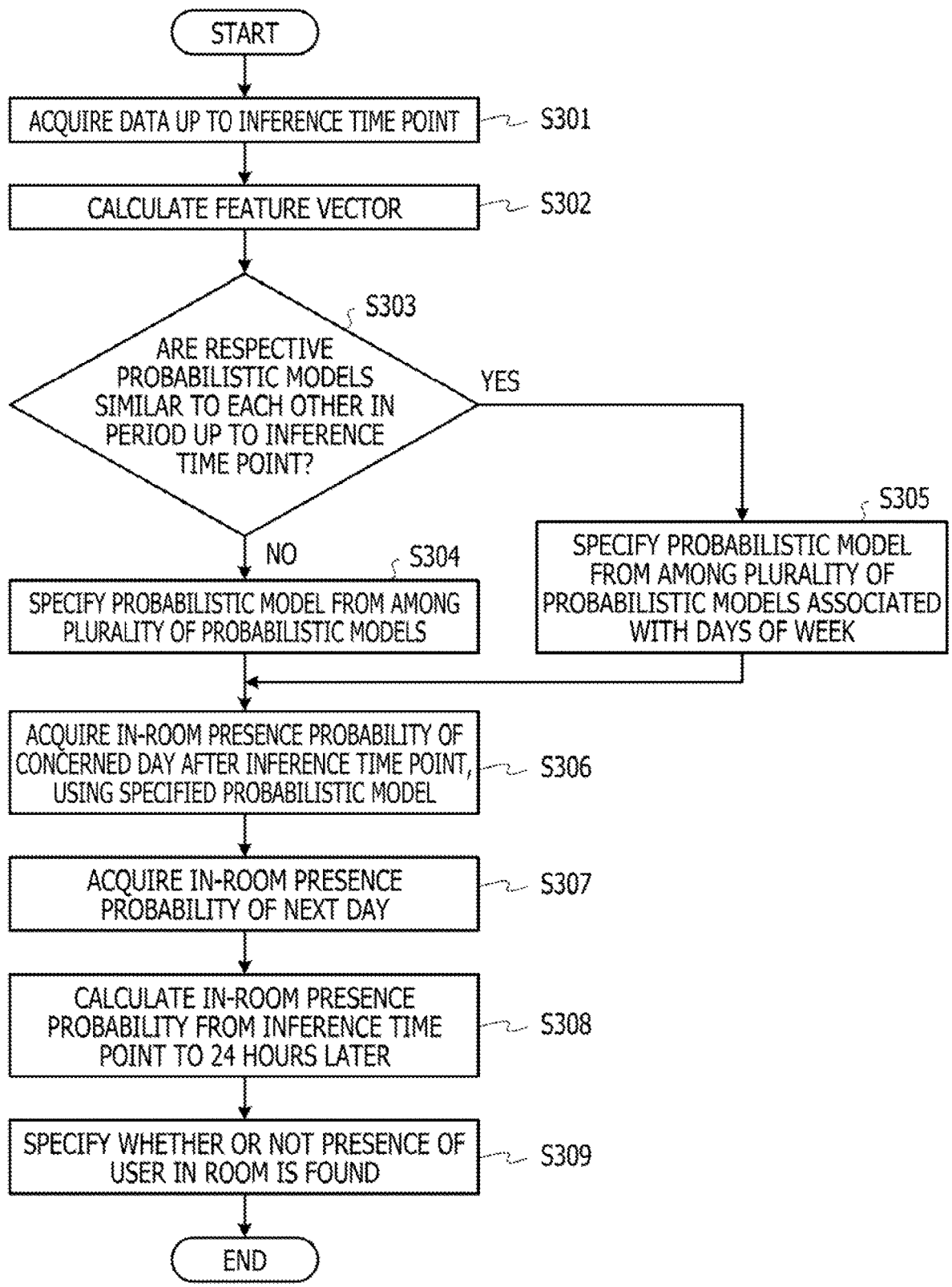
FIG. 18 is a diagram explaining a prediction process in the edge terminal 200.

Here, the prediction process in the edge terminal 200 will be described with reference to FIG. 18. FIG. 18 is a flowchart illustrating a detailed process in S105 in FIG. 11. In the prediction process in the edge terminal 200, S307 and S308 can be omitted as needed. That is, the next process of S306 is S309.

The acquisition unit 211 acquires data up to the inference time point (S301).

The processing unit 212 calculates the feature vector (S302).

The processing unit 212 determines whether or not respective probabilistic models of a plurality of probabilistic models are similar to each other in a period up to the inference time point. For example, the processing unit 212 determines whether or not the respective in-room presence probabilities of the plurality of probabilistic models delivered from the cloud server 100 are similar during a period from the start of the unit time to the inference time point. For example, the processing unit 212 makes determination depending on whether or not a difference between the respective in-room presence probabilities of the plurality of probabilistic models is equal to or greater than a preset threshold value. When it is determined that the in-room presence probabilities are not similar, the processing unit 212 shifts to S304 (S303: NO). On the other hand, when it is determined that the in-room presence probabilities are similar, the processing unit 212 shifts to S305 (S303: YES).

The processing unit 212 specifies a probabilistic model from among the plurality of probabilistic models. The processing unit 212 specifies a probabilistic model similar to the calculated feature vector. For example, the processing unit 212 specifies a probabilistic model having an in-room presence probability with a similar feature vector, from among the plurality of probabilistic models delivered from the cloud server 100 (S304).

The processing unit 212 specifies a probabilistic model from among a plurality of probabilistic models each associated with a day of the week. The processing unit 212 specifies a probabilistic model using the day of the week of the concerned day (S305).

The processing unit 212 acquires the in-room presence probability of the concerned day after the inference time point, using the specified probabilistic model (S306).

The processing unit 212 acquires the in-room presence probability of the next day. For example, the processing unit 212 specifies a probabilistic model associated with the day of the week of the next day, from among the plurality of probabilistic models delivered from the cloud server 100. Then, the processing unit 212 acquires the in-room presence probability of the next day, using the specified probabilistic model (S307).

The processing unit 212 calculates the in-room presence probability from the inference time point to 24 hours later (S308).

The processing unit 212 specifies whether or not the presence of the user in the room is found. For example, the processing unit 212 specifies whether or not the presence of the user in the room is found, based on the result of comparison between the calculated in-room presence probability and a preset threshold value. For example, the processing unit 212 outputs the time point and a time length when the in-room presence probability exceeds the threshold value (for example, 0.5). Furthermore, the processing unit 212 outputs the time point and a time length during which the in-room presence probability is equal to or smaller than the threshold value (for example, 0.5) (S309).

[Process of Calculating User's In-Room Presence Probability]

Figure 19:
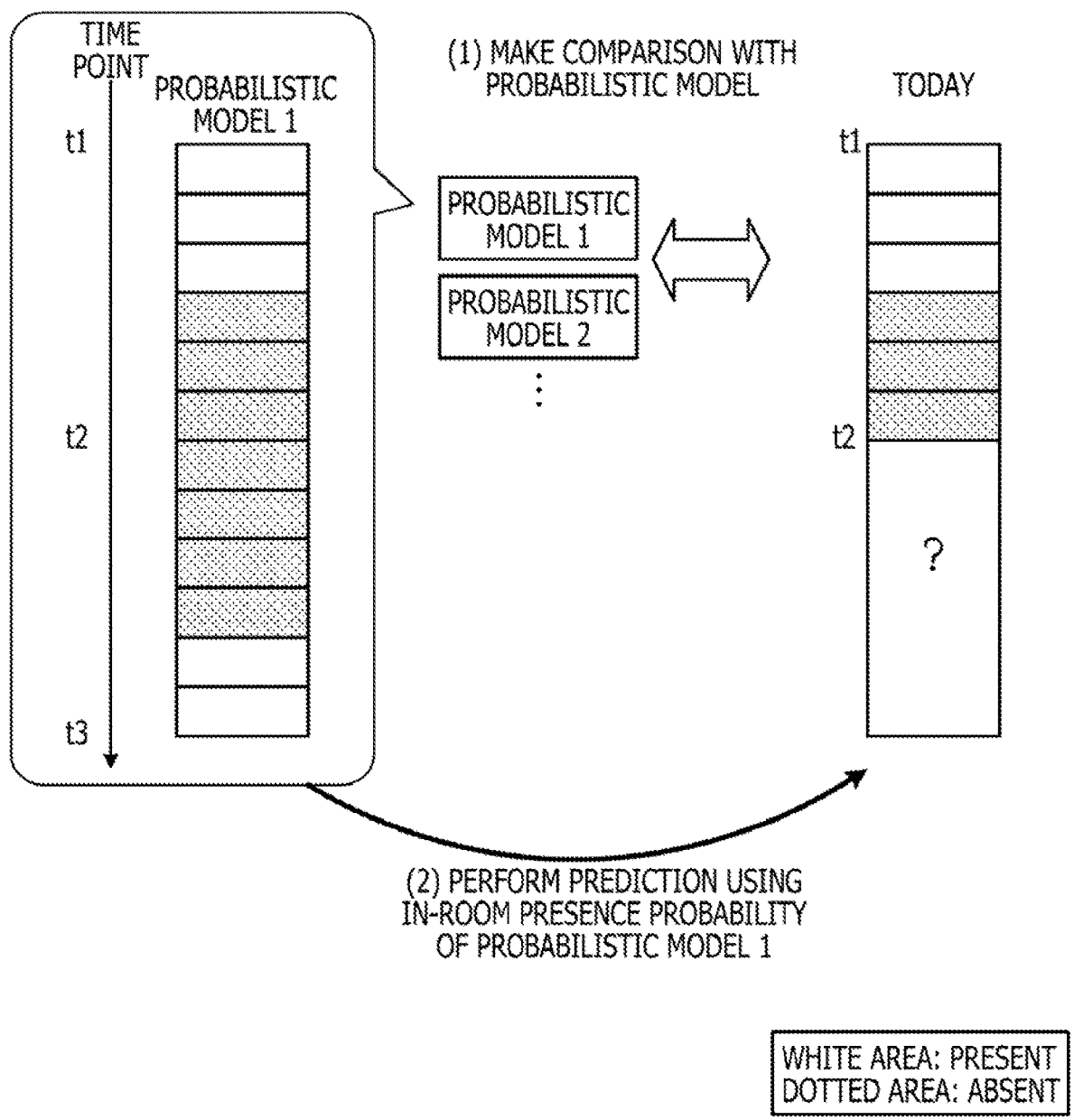
FIG. 19 is a diagram explaining, a process of calculating a user's in-room presence probability.

Here, a process in which the processing unit 212 calculates the in-room presence probability of the user will be described with reference to FIG. 19. The processing unit 212 compares a feature vector from t1 to t2, which is the inference time point, with the in-room presence probability of each of a plurality of probabilistic models. Then, the processing unit 212 specifies a probabilistic model having an in-room presence probability most similar to the feature vector from t1 to t2, which is the inference time point, from among the plurality of probabilistic models. Subsequently, the processing unit 212 refers to the in-room presence probability of the probabilistic model, and predicts the in-room presence probability of the user at each time point in a period from t2 to t3.

[Hardware]

Figure 20:
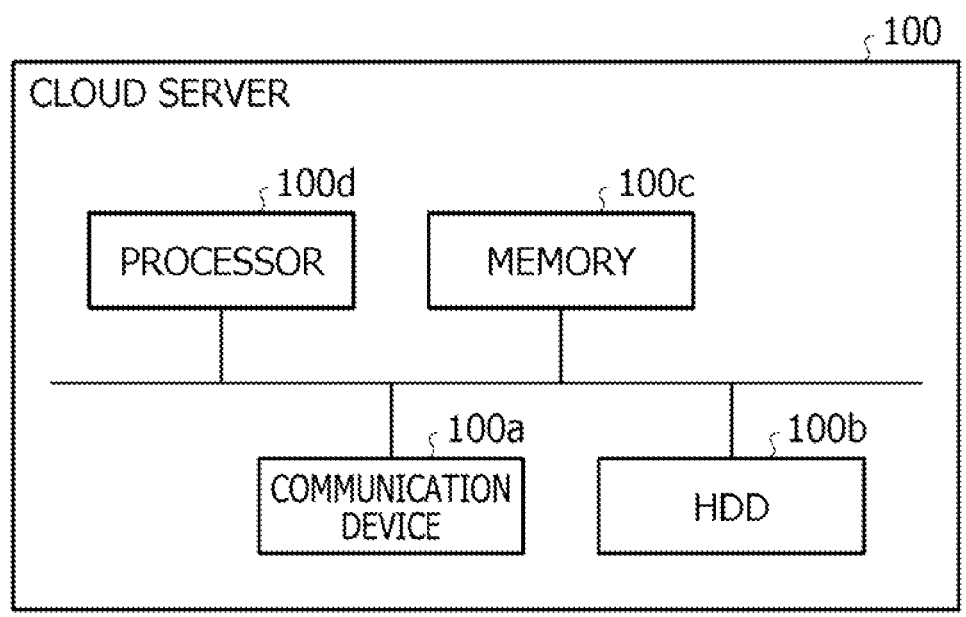
FIG. 20 is a diagram explaining a hardware configuration example.

FIG. 20 is a diagram explaining a hardware configuration example. As illustrated in FIG. 20, the cloud server 100 includes a communication device 100a, a hard disk drive (HDD) 100b, a memory 100c, and a processor 100d. Furthermore, the respective units illustrated in FIG. 20 are mutually connected by a bus or the like.

The communication device 100a is a network interface card or the like and communicates with another server. The HDD 100b stores a program that activates the functions illustrated in FIG. 2 or the like, and a DB.

The processor 100d reads a program that executes processing similar to the processing of each processing unit illustrated in FIG. 2 or the like from the HDD 100b or the like, and develops the read program in the memory 100c, thereby activating a process that executes each function described with reference to FIG. 2 or the like. For example, this process executes a function similar to the function of each processing unit included in the cloud server 100. For example, the processor 100d reads a program having functions similar to the functions of the acquisition unit 111, the generation unit 112, the selection unit 113, the delivery unit 114, the processing unit 115, and the like from the HDD 100b or the like. Then, the processor 100d executes a process that executes processing similar to the processing of the acquisition unit 111, the generation unit 112, the selection unit 113, the delivery unit 114, the processing unit 115, and the like.

In this manner, the cloud server 100 behaves as an information processing device that executes a data generation method by reading and executing a program. Furthermore, the cloud server 100 can also implement functions similar to the functions of the above-described embodiments by reading the program mentioned above from a recording medium by a medium reading device and executing the read program mentioned above. Note that the program mentioned in the other embodiment is not limited to being executed by the cloud server 100. For example, the embodiments may be similarly applied to a case where another computer or server executes the program, or a case where such computer and server cooperatively execute the program.

This program may be distributed via a network such as the Internet. Furthermore, this program may be recorded on a non-transitory computer-readable recording medium such as a hard disk, flexible disk (FD), compact disc read only memory (CD-ROM), magneto-optical disk (MO), or digital versatile disc (DVD), and may be executed by being read from the recording medium by a computer.

Figure 21:
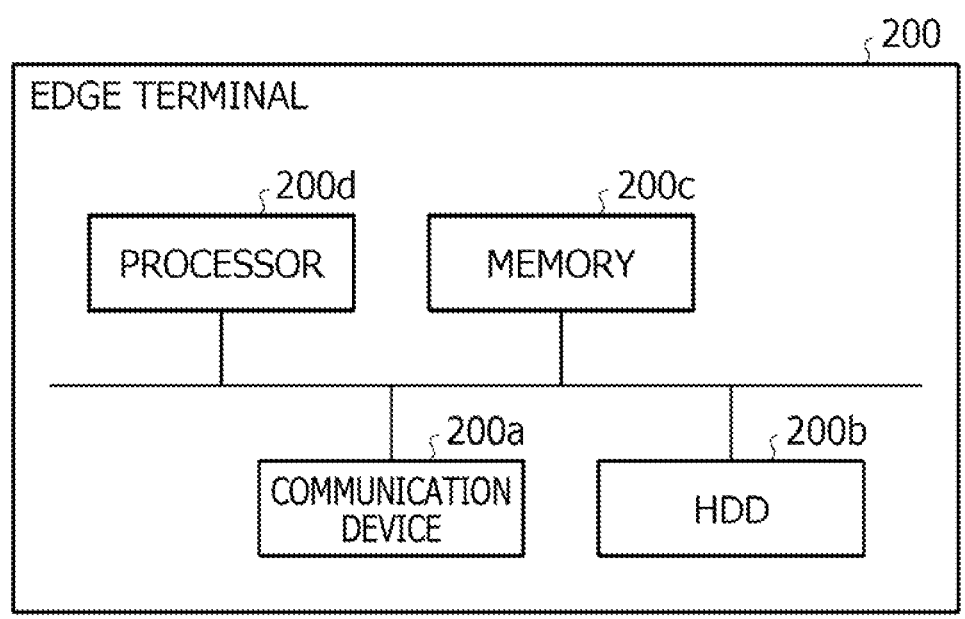
FIG. 21 is a diagram explaining a hardware configuration example.

FIG. 21 is a diagram explaining the hardware configuration example. As illustrated in FIG. 21, the edge terminal 200 includes a communication device 200a, an HDD 200b, a memory 200c, and a processor 200d. Furthermore, the respective units illustrated in FIG. 21 are mutually connected by a bus or the like.

The communication device 200a is a network interface card or the like and communicates with another server. The HDD 200b stores a program that activates the functions illustrated in FIG. 8 or the like, and a DB.

The processor 200d reads a program that executes processing similar to the processing of each processing unit illustrated in FIG. 8 or the like from the HDD 200b or the like, and develops the read program in the memory 200c, thereby activating a process that executes each function described with reference to FIG. 8 or the like. For example, this process executes a function similar to the function of each processing unit included in the edge terminal 200. For example, the processor 200d reads a program having functions similar to the functions of the acquisition unit 211, the processing unit 212, the execution unit 213, or the like from the HDD 200b or the like. Then, the processor 200d executes a process that executes processing similar to the processing of the acquisition unit 211, the processing unit 212, the execution unit 213, or the like.

In this manner, the edge terminal 200 behaves as an information processing device that executes the data generation method by reading and executing a program. Furthermore, the edge terminal 200 may also implement functions similar to the functions of the above-described embodiments, by reading the program mentioned above from a recording medium by a medium reading device and executing the read program mentioned above. Note that the program mentioned in the other embodiment is not limited to being executed by the edge terminal 200. For example, the embodiments may be similarly applied to a case where another computer or server executes the program, or a case where such computer and server cooperatively execute the program.

This program may be distributed via a network such as the Internet. Furthermore, this program may be recorded on a computer-readable recording medium such as a hard disk, flexible disk (FD), CD-ROM, MO, or DVD, and may be executed by being read from the recording medium by a computer.

Figure 22:
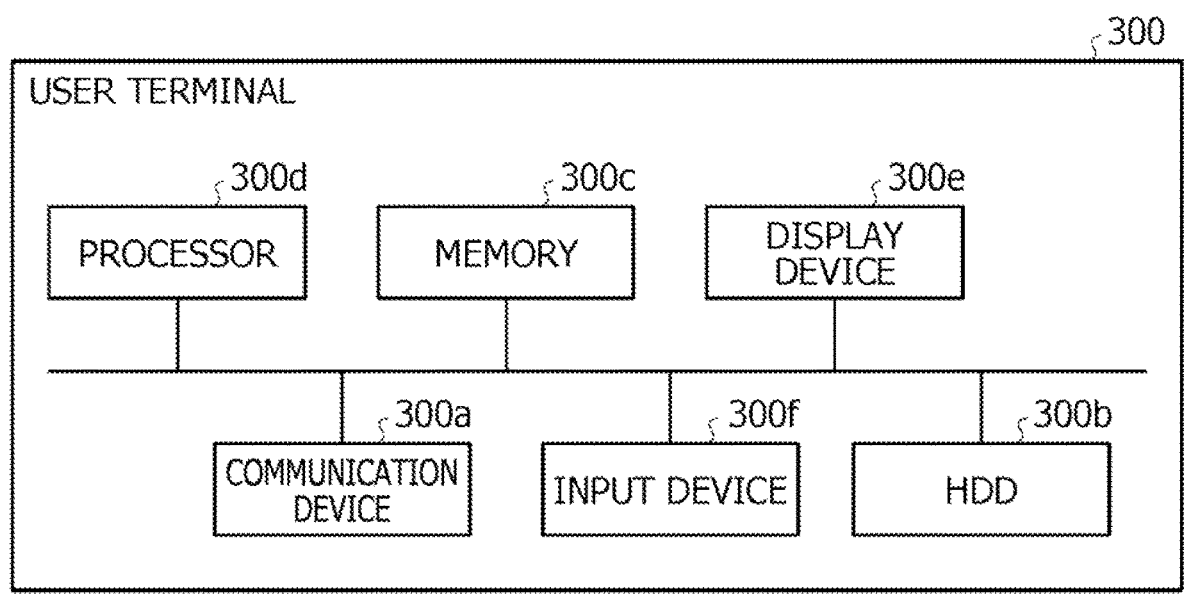
FIG. 22 is a diagram explaining a hardware configuration example.

FIG. 22 is a diagram explaining the hardware configuration example. As illustrated in FIG. 22, the user terminal 300 includes a communication device 300a, an HDD 300b, a memory 300c, a processor 300d, a display device 300e, and an input device 300f. Furthermore, the respective units illustrated in FIG. 23 are mutually connected by a bus or the like.

The communication device 300a is a network interface card or the like and communicates with another server. The HDD 300b stores a program that activates the functions illustrated in FIG. 10 or the like, and a DB.

The processor 300d reads a program that executes processing similar to the processing of each processing unit illustrated in FIG. 10 or the like from the HDD 300b or the like, and develops the read program in the memory 300c, thereby activating a process that executes each function described with reference to FIG. 10 or the like. For example, this process executes a function similar to the function of each processing unit included in the user terminal 300. For example, the processor 300d reads a program having a function similar to the function of the control unit 302 or the like from the HDD 300b or the like. Then, the processor 300d executes a process that executes processing similar to the processing of the control unit 302 or the like.

In this manner, the user terminal 300 behaves as an information processing device that executes the data generation method by reading and executing a program. Furthermore, the user terminal 300 may also implement functions similar to the functions of the above-described embodiments, by reading the program mentioned above from a recording medium by a medium reading device and executing the read program mentioned above. Note that the program mentioned in the other embodiment is not limited to being executed by the user terminal 300. For example, the embodiments may be similarly applied to a case where another computer or server executes the program, or a case where such computer and server cooperatively execute the program.

This program may be distributed via a network such as the Internet. Furthermore, this program may be recorded on a computer-readable recording medium such as a hard disk, flexible disk (FD), CD-ROM, MO, or DVD, and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a selection program that causes at least one computer to execute a process, the process comprising:
   receiving identification information including a processing capacity of a terminal, corresponding to an air conditioner provided in a room, from the terminal;
   obtaining a plurality of user state transition patterns by clustering vectors that indicate user state transitions so that a distance between each of the vectors included in one of clusters is less than or equal to a threshold, each of the user state transitions being a transition of a state of a user during a certain time period, each of the user state transitions being one state selected from a first state which indicates that the user is present in the room and a second state which indicates that the user is absent in the room, each of the user state transitions being associated with the certain time period and a content of control for the air conditioner;
   selecting one or more user state transition patterns, the number of user state transition patterns being selected according to the processing capacity of the terminal, from among the plurality of user state transition patterns, the selecting operation selecting one or more user state transition patterns according to the processing capacity of the terminal; and
   transmitting the selected one or more user state transition patterns to the terminal, wherein
   the higher the processing capacity of the terminal, the greater the number of the user state transition patterns the selecting operation selects for transmission to the terminal by the selecting operation,
   the selecting operation determines an upper limit on the number of user state transition patterns to be transmitted to a high-end model terminal and determines an upper limit on the number of user state transition patterns to be transmitted to a low-end model terminal of smaller processing capacity than the high-end model terminal, and
   the selecting operation selects the high-end-model-terminal, upper-limit number to be greater than the low-end-model-terminal, upper-limit number.

2. The non-transitory computer-readable storage medium according to claim 1, wherein
   the selecting includes calculating a number of features for each of the user state transition patterns when the number of the user state transition patterns exceeds the upper limit number,
   the selecting includes specifying a number of the user state transition patterns equal to the upper limit number, in an order from one of the user state transition patterns with a greatest number of features, from among the user state transition patterns, and
   the process further comprising delivering the specified user state transition patterns to the terminal.

3. An information processing device comprising:
   one or more memories; and
   one or more processors coupled to the one or more memories and the one or more processors configured to:
   receive identification information including a processing capacity of a terminal, corresponding to an air conditioner provided in a room, from the terminal,
   obtain a plurality of user state transition patterns by clustering vectors that indicate user state transitions so that a distance between each of the vectors included in one of clusters is less than or equal to a threshold, each of the user state transitions being a transition of a state of a user during a certain time period, each of the user state transitions being one state selected from a first state which indicates that the user is present in the room and a second state which indicates that the user is absent in the room, each of the user state transitions being associated with the certain time period and a content of control for the air conditioner,
   selecting one or more user state transition patterns, the number of user state transition patterns being selected according to the processing capacity of the terminal from among the plurality of user state transition patterns, the selecting operation selecting one or more user state transition patterns according to the processing capacity of the terminal; and
   transmitting the selected one or more user state transition patterns to the terminal, wherein
   the higher the processing capacity of the terminal, the greater the number of the user state transition patterns the selecting operation selects for transmission to the terminal by the selecting operation,
   the selecting operation determines an upper limit on the number of user state transition patterns to be transmitted to a high-end model terminal and determines an upper limit on the number of user state transition patterns to be transmitted to a low-end model terminal of smaller processing capacity than the high-end model terminal, and
   the selecting operation selects the high-end-model-terminal, upper-limit number to be greater than the low-end-model-terminal, upper-limit number.

4. The information processing device according to claim 3, wherein the one or more processors configured to:
   calculate a number of features for each of the user state transition patterns when the number of the user state transition patterns exceeds the upper limit number,
   specify a number of the user state transition patterns equal to the upper limit number, in an order from one of the user state transition patterns with a greatest number of features, from among the user state transition patterns, and
   deliver the specified user state transition patterns to the terminal.

5. A control method for a computer to execute a process comprising:
- receiving identification information including a processing capacity of a terminal, corresponding to an air conditioner provided in a room, from the terminal;
- obtaining a plurality of user state transition patterns by clustering vectors that indicate user state transitions so that a distance between each of the vectors included in one of clusters is less than or equal to a threshold, each of the user state transitions being a transition of a state of a user during a certain time period, each of the user state transitions being one state selected from a first state which indicates that the user is present in the room and a second state which indicates that the user is absent in the room, each of the user state transitions being associated with the certain time period and a content of control for the air conditioner;
- selecting one or more user state transition patterns, the number of user state transition patterns being selected according to the processing capacity of the terminal, from among the plurality of user state transition patterns, the selecting operation selecting one or more user state transition patterns according to the processing capacity of the terminal; and
- transmitting the selected one or more user state transition patterns to the terminal, wherein the higher the processing capacity of the terminal, the greater the number of the user state transition patterns the selecting operation selects for transmission to the terminal by the selecting operation, the selecting operation determines an upper limit on the number of user state transition patterns to be transmitted to a high-end model terminal and determines an upper limit on the number of user state transition patterns to be transmitted to a low-end model terminal of smaller processing capacity than the high-end model terminal, and the selecting operation selects the high-end-model-terminal, upper-limit number to be greater than the low-end-model-terminal, upper-limit number.

6. The control method according to claim 5, wherein the selecting includes calculating a number of features for each of the user state transition patterns when the number of the user state transition patterns exceeds the upper limit number, the selecting includes specifying a number of the user state transition patterns equal to the upper limit number, in an order from one of the user state transition patterns with a greatest number of features, from among the plurality of the user state transition patterns, and the process further comprising delivering the specified user state transition patterns to the terminal.

* * * * *

UNITED STATES PATENT AND TRADEMARK OFFICE
CERTIFICATE OF CORRECTION

| | | |
|---|---|---|
| PATENT NO. | : 12,175,388 B2 | Page 1 of 1 |
| APPLICATION NO. | : 17/359837 | |
| DATED | : December 24, 2024 | |
| INVENTOR(S) | : T. Ishida | |

It is certified that error appears in the above-identified patent and that said Letters Patent is hereby corrected as shown below:

In the Claims

Column 15, Line 33 (Claim 1), please change "one of clusters" to -- one of the clusters --.
Column 16, Line 23 (Claim 3), please change "one of clusters" to -- one of the clusters --.
Column 17, Line 9 (Claim 5), please change "one of clusters" to -- one of the clusters --.

Signed and Sealed this
Twenty-second Day of July, 2025

Coke Morgan Stewart
*Acting Director of the United States Patent and Trademark Office*